US008363283B2

(12) United States Patent
Fukunishi

(10) Patent No.: US 8,363,283 B2
(45) Date of Patent: Jan. 29, 2013

(54) PRINT SETTING APPARATUS AND PRINTER FOR ADDING GROUND PATTERN TO IMAGE AND RESOLVING CONFLICTING SETTINGS

(75) Inventor: Shigeki Fukunishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1211 days.

(21) Appl. No.: 12/186,579

(22) Filed: Aug. 6, 2008

(65) Prior Publication Data
US 2009/0059278 A1   Mar. 5, 2009

(30) Foreign Application Priority Data

Aug. 27, 2007   (JP) ................... 2007-219966
Jun. 10, 2008   (JP) ................... 2008-151836

(51) Int. Cl.
*H04N 1/40* (2006.01)
(52) U.S. Cl. ........ 358/3.28; 358/1.15; 358/1.9; 382/100
(58) Field of Classification Search .................. None
See application file for complete search history.

(56) References Cited

U.S. PATENT DOCUMENTS

2006/0103868 A1*  5/2006  Mitsui ................ 358/1.13
2006/0268331 A1* 11/2006  Fukunishi ............. 358/1.15
2009/0059283 A1*  3/2009  Nigorikawa et al. ...... 358/1.15

FOREIGN PATENT DOCUMENTS

| JP | 2001-324898 | 11/2001 |
| JP | 2004-272483 | 9/2004 |
| JP | 2005-006169 | 1/2005 |
| JP | 2006-331203 | 12/2006 |

* cited by examiner

*Primary Examiner* — Benjamin O Dulaney
(74) *Attorney, Agent, or Firm* — IPUSA, PLLC

(57) ABSTRACT

A printing setting apparatus is disclosed that includes a first part to establish a connection to a printing apparatus; a second part to make a setting with respect to printing of printing data; a third part to add a first ground pattern to the printing data in response to the second part making a first setting for adding the first ground pattern; a fourth part to obtain information indicating whether a second setting for adding a second ground pattern is made in the printing apparatus; and a fifth part to disable the second part from accepting the first setting in response to the fourth part obtaining the information indicating that the second setting is made in the printing apparatus, and enable the second part to accept the first setting in response to the fourth part obtaining the information indicating that the second setting is not made in the printing apparatus.

6 Claims, 14 Drawing Sheets

PRINT SETTING APPARATUS AND PRINTER FOR ADDING GROUND PATTERN TO IMAGE AND RESOLVING CONFLICTING SETTINGS

BACKGROUND OF THE INVENTION

1. Field of the Invention

The present invention relates generally to printing setting apparatuses, printing apparatuses, and recording media, and more particularly to a printing setting apparatus that makes (determines) settings with respect to printing of printing data to be transmitted to a printing apparatus, a printing apparatus such as a printer that prints the printing data from the printing setting apparatus, and a computer-readable recording medium having a program recorded therein for implementing functions (related to the present invention) of a computer that controls the printing setting apparatus and the printing apparatus.

2. Description of the Related Art

Ground pattern printing is a known technique for distinguishing a copy from its original or preventing the original from being copied. There are two known methods of ground pattern printing. One is adding a ground pattern with a printer driver. This has the advantage that all fonts installed in a host such as a personal computer (PC) are available although job data (printing data) increase in size. The other is adding a ground pattern with a printer. This has the advantage that the job data between the host and the printer can be reduced in size although available fonts are limited.

These two methods have their respective advantages and disadvantages, so that they are often used together.

Japanese Laid-open Patent Applications No. 2001-324898, No. 2005-006169, and No. 2006-331203 show adding a ground pattern to printing data on the host side and printing the printing data with the ground pattern in a printing apparatus in order to distinguish a copy from its original.

However, the conventional techniques have a problem in that when both methods are used together, a ground pattern is added by the printer driver and a ground pattern is also added by the printer, so that both ground patterns may overlap to prevent an output result from functioning as ground patterns. This opens a loophole in security and causes a problem in such an environment as an office handling critical documents, where a system administrator requires printing to be always accompanied by adding a ground pattern.

SUMMARY OF THE INVENTION

According to one aspect of the present invention, a ground pattern is prevented from being added redundantly or doubly to printing data.

According to one or more embodiments of the present invention, there are provided a printing setting apparatus and a printing apparatus capable of preventing a ground pattern from being added redundantly or doubly to printing data, and a computer-readable recording medium on which is recorded a program to be executed by a computer controlling the printing setting apparatus and a computer-readable recording medium on which is recorded a program to be executed by a computer controlling the printing apparatus.

According to one embodiment of the present invention, a printing setting apparatus is provided that includes a communication connection part configured to establish a connection to a printing apparatus so as to enable a communication therewith; a printing setting part configured to make a setting with respect to printing of printing data to be transmitted to the printing apparatus; a ground pattern adding part configured to add a first ground pattern to the printing data in response to the printing setting part making a first setting for adding the first ground pattern; a ground pattern addition information obtaining part configured to obtain ground pattern addition information indicating whether a second setting for adding a second ground pattern is made in the printing apparatus by bidirectionally performing the communication with the printing apparatus; and a ground pattern addition setting information acceptance control part configured to disable the printing setting part from accepting the first setting for adding the first ground pattern in response to the ground pattern addition information obtaining part obtaining the ground pattern addition information indicating that the second setting for adding the second ground pattern is made in the printing apparatus, and to enable the printing setting part to accept the first setting for adding the first ground pattern in response to the ground pattern addition information obtaining part obtaining the ground pattern addition information indicating that the second setting for adding the second ground pattern is not made in the printing apparatus.

According to one embodiment of the present invention, a printing apparatus is provided that includes a communication connection part configured to establish a connection to a printing setting apparatus so as to enable a communication therewith; a ground pattern addition setting part configured to make a setting for adding a first ground pattern; a ground pattern adding part configured to add the first ground pattern to printing data received from the printing setting apparatus in response to the ground pattern addition setting part making the setting for adding the first ground pattern; a ground pattern changing part configured to replace a second ground pattern with the first ground pattern by ignoring the second ground pattern and enabling the ground pattern adding part to add the first ground pattern to the printing data in response to receiving the printing data having the second ground pattern added thereto from the printing setting apparatus when the setting for adding the first ground pattern is made by the ground pattern addition setting part; and a processing part configured to process the printing data having one of the first ground pattern and the second ground pattern added thereto.

According to one embodiment of the present invention, a computer-readable recording medium is provided that has a program recorded therein for causing a computer to execute a method, the computer controlling a printing setting apparatus including a communication connection part configured to establish a connection to a printing apparatus so as to enable a communication therewith; a printing setting part configured to make a setting with respect to printing of printing data to be transmitted to the printing apparatus; and a ground pattern adding part configured to add a first ground pattern to the printing data in response to the printing setting part making a first setting for adding the first ground pattern, the method including the steps of (a) obtaining ground pattern addition information indicating whether a second setting for adding a second ground pattern is made in the printing apparatus by bidirectionally performing the communication with the printing apparatus; and (b) disabling the printing setting part from accepting the first setting for adding the first ground pattern in response to step (a) obtaining the ground pattern addition information indicating that the second setting for adding the second ground pattern is made in the printing apparatus, and enabling the printing setting part to accept the first setting for adding the first ground pattern in response to step (a) obtaining the ground pattern addition information indicating that the second setting for adding the second ground pattern is not made in the printing apparatus.

According to one aspect of the present invention, a printing setting apparatus obtains ground pattern addition information indicating whether settings for adding a ground pattern are made in a printing apparatus through bidirectional communications with the printing apparatus. If the ground pattern addition information indicates that settings for adding a ground pattern are made in the printing apparatus, acceptance of settings for adding a ground pattern is prohibited in the printing setting apparatus. If the ground pattern addition information indicates that settings for adding a ground pattern are not made in the printing apparatus, acceptance of settings for adding a ground pattern is authorized in the printing setting apparatus. As a result, printing data having no ground pattern added thereto are transmitted to the printing apparatus if settings for adding a ground pattern are made on the printing apparatus side, and printing data having a ground pattern added thereto are transmitted to the printing apparatus if settings for adding a ground pattern are not made on the printing apparatus side. Thus, it is possible to prevent a ground pattern from being added redundantly or doubly to printing data.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

[Printer System Configuration]

Figure 1:
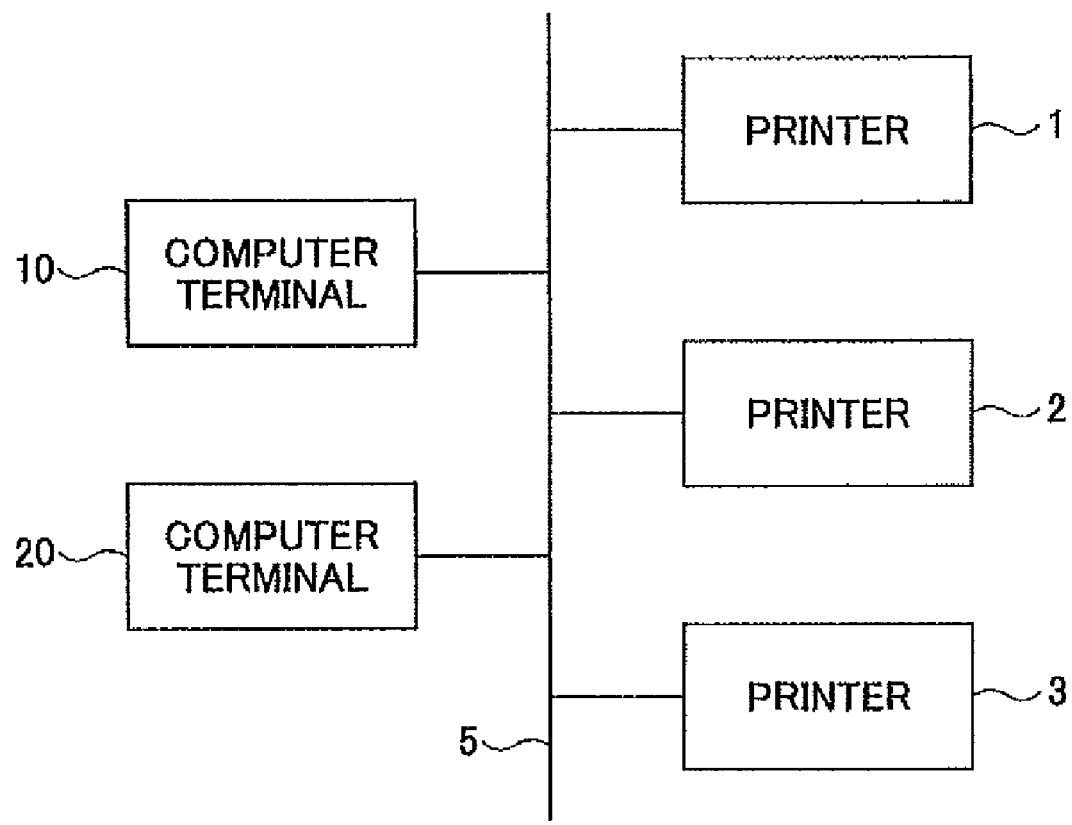
FIG. 1 is a diagram showing a configuration of a printer system according to an embodiment of the present invention.

First, a description is given, with reference to FIG. 1, of a printer system according to an embodiment of the present invention.

FIG. 1 is a diagram showing a configuration of the printer system.

Referring to FIG. 1, each of computer terminals 10 and 20 is connected to each of printers 1, 2, and 3 through a network 5 such as a local area network (LAN) so as to be able to communicate with the printers 1 through 3. Each of the computer terminals 10 and 20 is capable of selecting one of the connected printers 1 through 3 as an output destination of a print job (printing data), sending the print job to the selected output destination, and causing the selected output destination to perform printing through a printer driver from an application.

Each of the computer terminals 10 and 2G is an information processor (host apparatus) such as a personal computer (PC) or workstation, and has a function as a printing setting apparatus. Each of the computer terminals 10 and 20 may be a client computer or a print server. In the case of a print server system mode, a client computer may be a Web client (Web server, Web browser, etc.) of a print server.

Each of the printers 1 through 3 is a printing apparatus that prints the printing data of a print job from the computer terminal 10 or 20 on paper as a visible image, and has only a printing function like a laser printer, an LED printer, or an inkjet printer. The printers 1 through 3 may be replaced with printing apparatuses (image forming apparatuses) such as digital copiers, digital multi-function machines, or facsimile machines having functions other than the printing function, such as a copying function. Each of the printers 1 through 3 may have the function of a print server.

Figure 2:
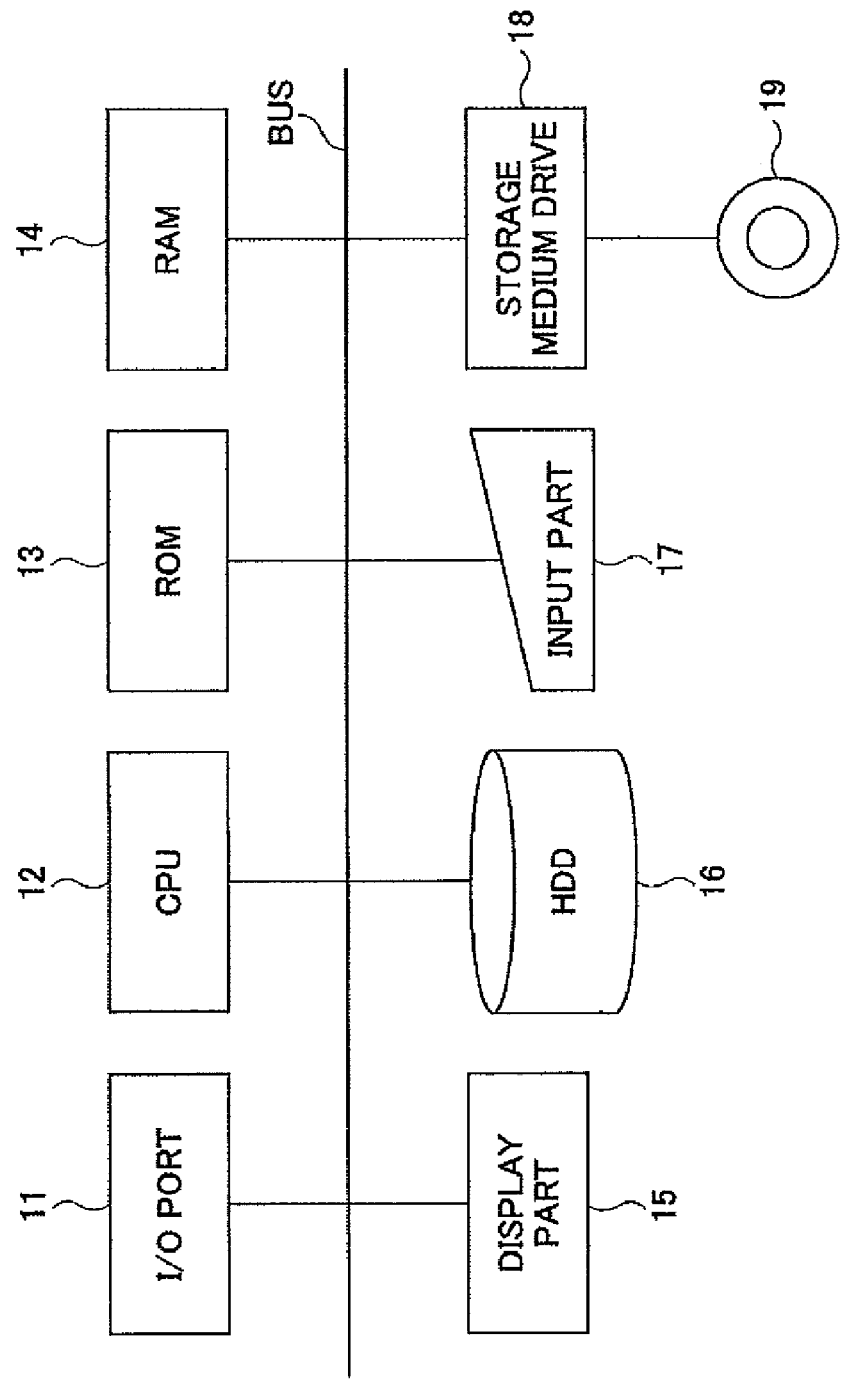
FIG. 2 is a block diagram showing a hardware configuration of a computer terminal of FIG. 1 according to the embodiment of the present invention.

Next, a description is given, with reference to FIG. 2, of a hardware configuration of the computer terminal 10. A graphical illustration and description of the hardware configuration of the computer terminal 20 are omitted because the computer terminal 20 has the same hardware configuration as the computer terminal 10.

FIG. 2 is a block diagram showing a hardware configuration of the computer terminal 10 of FIG. 1.

The computer terminal 10 includes an input/output (I/O) port 11, a central processing unit (CPU) 12, a read-only memory (ROM) 13, a random access memory (RAM) 14, a display part 15, a hard disk drive (HDD) 16, an input part 17, and a storage medium drive 18, which are connected through a bus.

The I/O port 11 is a communications part for communicating with the printers 1 through 3, which are external apparatuses, through the network 5.

The CPU 12 manages and controls the computer terminal 10.

The ROM 13 is a read-only storage part (memory) that contains a fixed control program executed by the CPU 12.

The RAM 14 is a readable and writable storage part into which the CPU 12 loads a program to be executed into, and the CPU 12 uses the RAM 14 as a work area for performing processing.

The display part 15 is, for example, a CRT display or an LCD display that displays an operations screen for setting various data and for making settings for adding a ground pattern.

The HDD 16 is a large-capacity storage part that stores a control program and various data.

The input part 17 accepts inputs of information on various operations. A keyboard and/or a pointing device such as a mouse can be used as the input part 17.

The storage medium drive 18 is a recording and reproduction part that records data on or reproduces data from a storage medium 19.

The storage medium 19 is a computer-readable recording medium attachable to and detachable from the computer terminal 10, such as an MO, CD-R, CD-RW, DVD+R, DVD+RW, DVD-R, DVD-RW, or DVD-RAM. A control program (control software) that executes printing control is recorded on the storage medium 19.

According to the computer terminal 10 thus configured, the CPU 12 is capable of reading a control program from the storage medium 19 through the storage medium drive 18 and installing the control program in the HDD 16 based on an operator's operations of the input part 17.

When power is turned on, the CPU 12 reads various programs including an operating system (OS), an application (application software), and a user interface in the HDD 16 in accordance with a boot loader (boot program) in the ROM 13, and installs the read programs in the RAM 14. Thereafter, the CPU 12 operates in accordance with the programs (that is, the CPU 12 selectively executes the programs as required), and controls the units including the display part 15. Thereby, the CPU 12 is capable of implementing various functions including functions as a communication connection part, a printing setting part, a ground pattern adding part, a ground pattern addition information obtaining part, a ground pattern addition setting acceptance control part, and a screen display part.

Next, a specific description is given, with reference to FIG. 3 through FIG. 9, of a software configuration and printing-related processing of the computer terminal 10. A graphical illustration and description of the software configuration and printing-related processing of the computer terminal 20 are omitted because the computer terminal 20 has the same software configuration and performs the same printing-related processing as the computer terminal 10. Further, the processing and control by a control program (control software) are actually executed by the CPU 12 operating in accordance with the control program, but are assumed to be executed by the control program for convenience of description. The same applies hereinafter in the case where the control program is described as performing some kind of processing or control.

Figure 3:
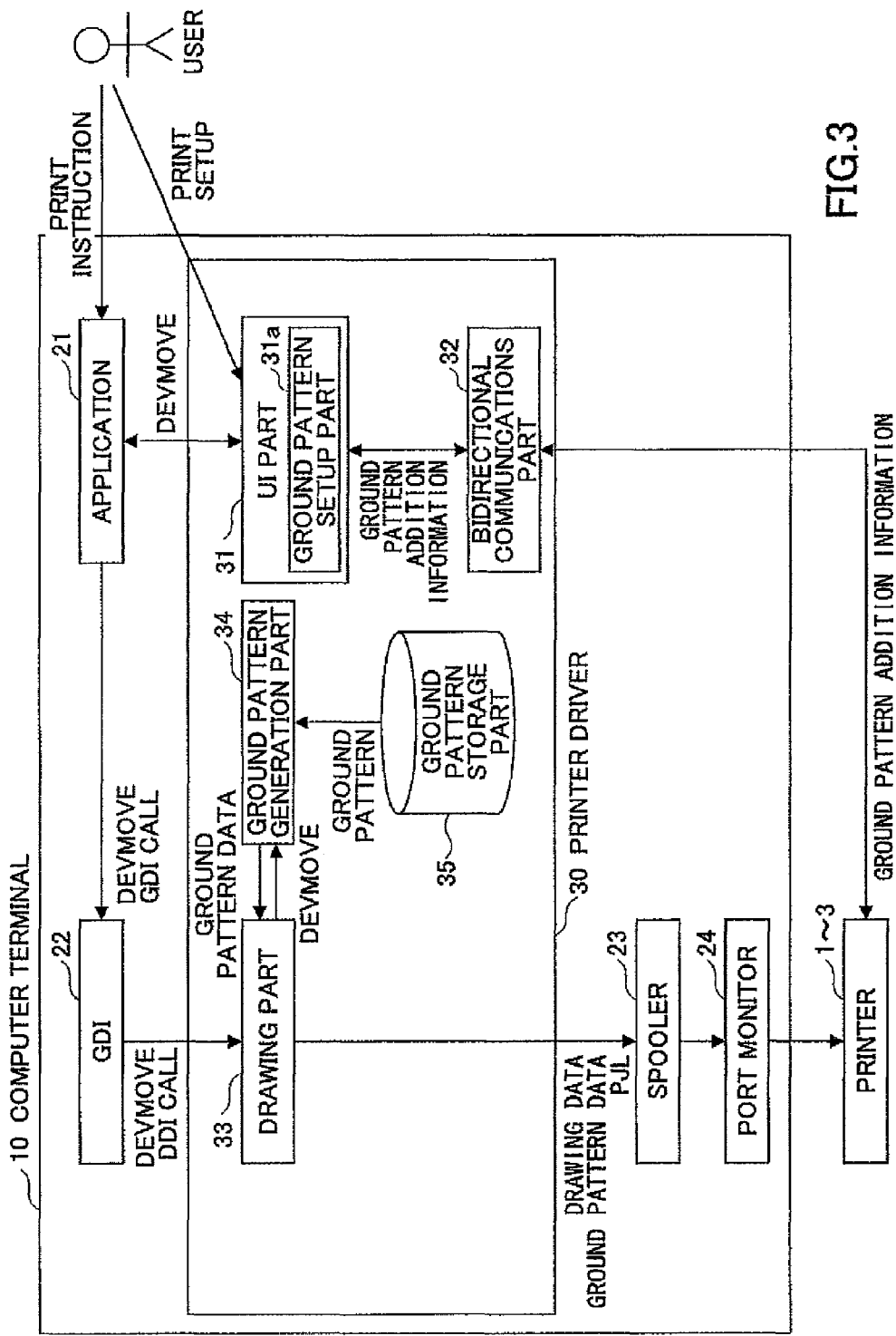
FIG. 3 is a block diagram showing a software configuration of the computer terminal of FIG. 1 according to the embodiment of the present invention.

FIG. 3 is a block diagram showing a software configuration of the computer terminal 10 of FIG. 1. In FIG. 3, a graphical illustration of the OS is omitted.

Figure 4:
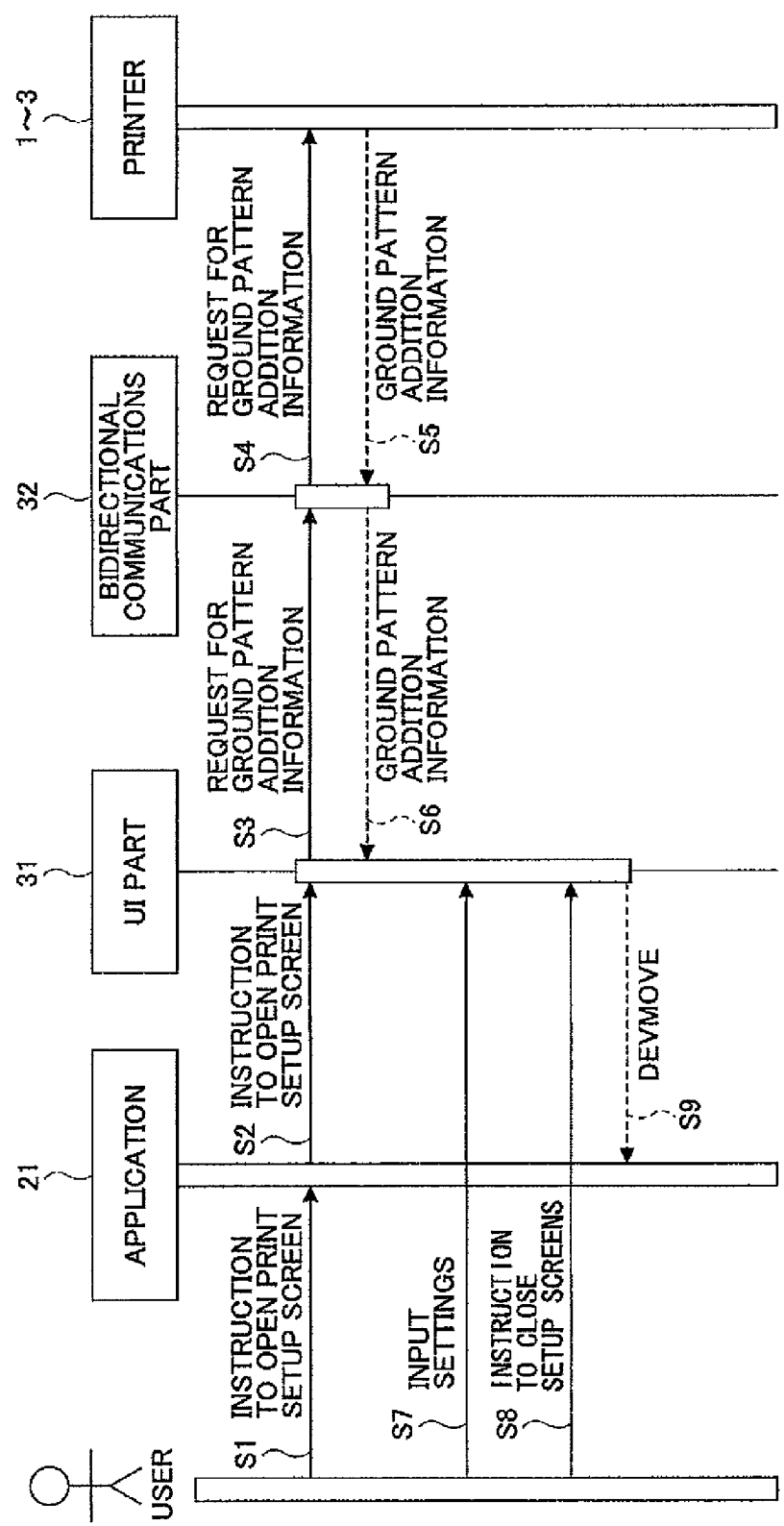
FIG. 4 is a diagram showing part of a processing sequence by control software of the computer terminal shown in FIG. 3 according to the embodiment of the present invention.

FIG. 4 is a diagram showing part of a processing sequence by the control software of the computer terminal 10 shown in FIG. 3.

Figure 5:
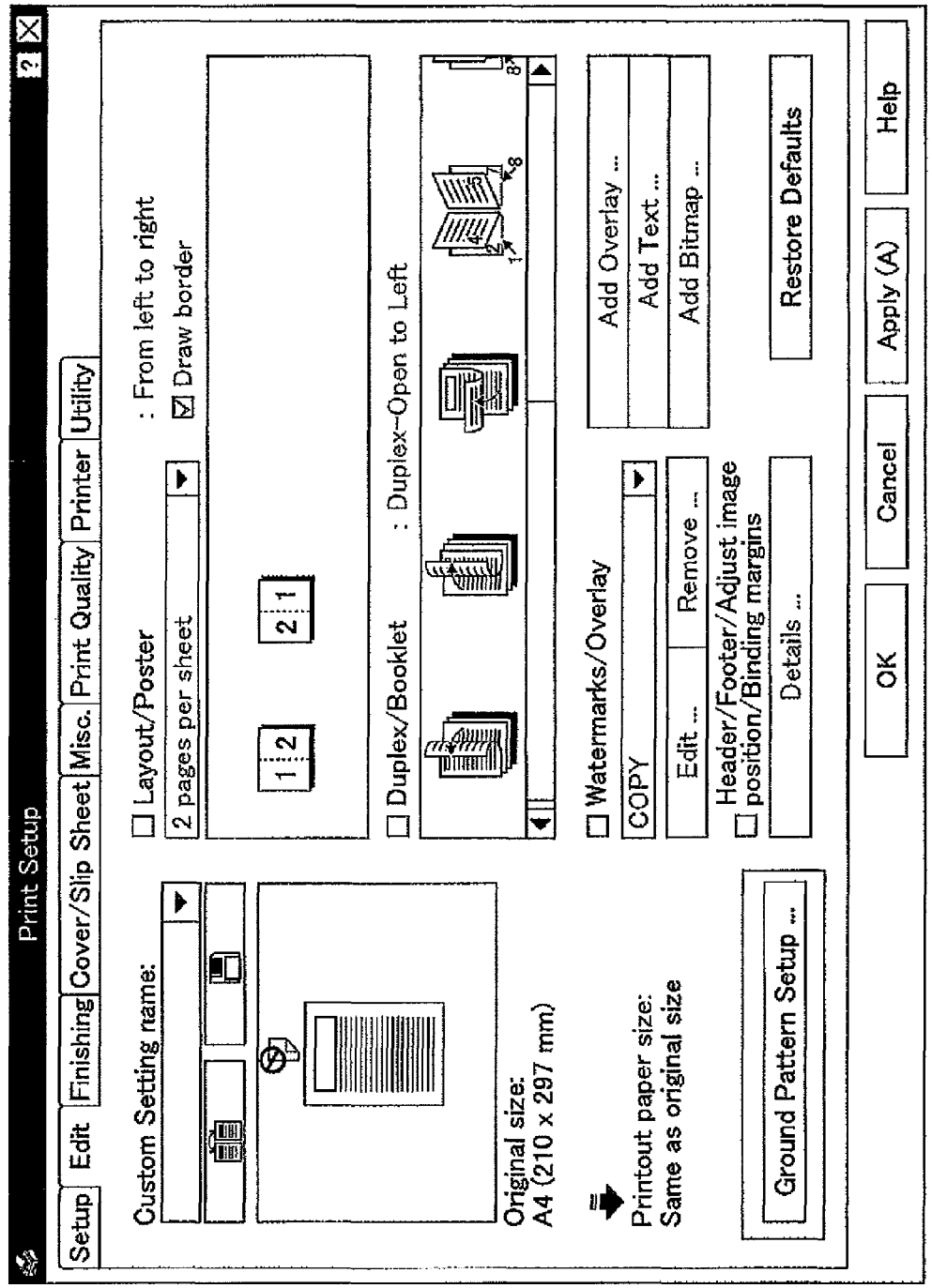
FIG. 5 is a diagram showing a print setup screen according to the embodiment of the present invention.
Figure 6:
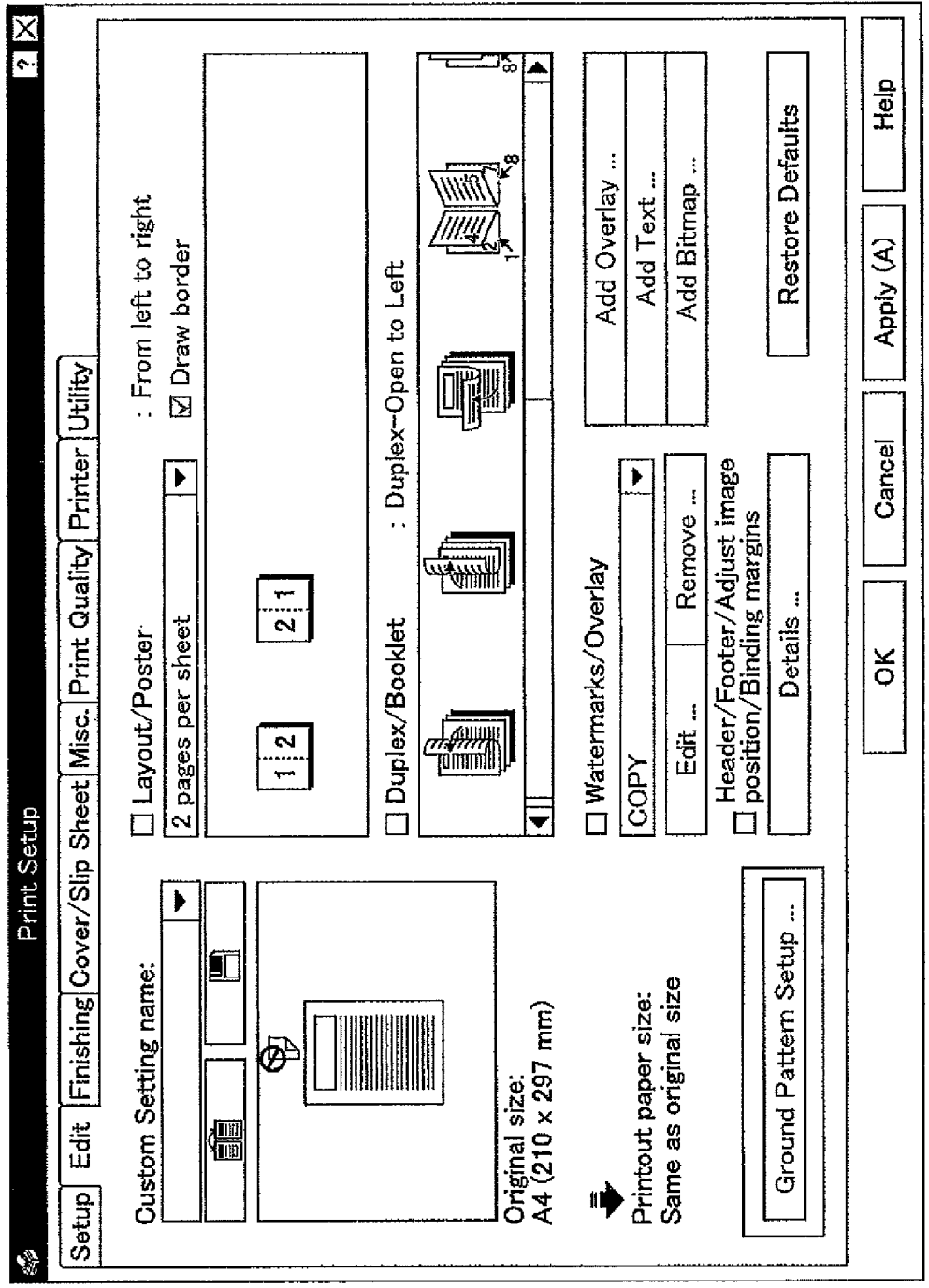
FIG. 6 is a diagram showing another print setup screen according to the embodiment of the present invention.

FIG. 5 and FIG. 6 are diagrams showing different print setup screens.

Figure 7:
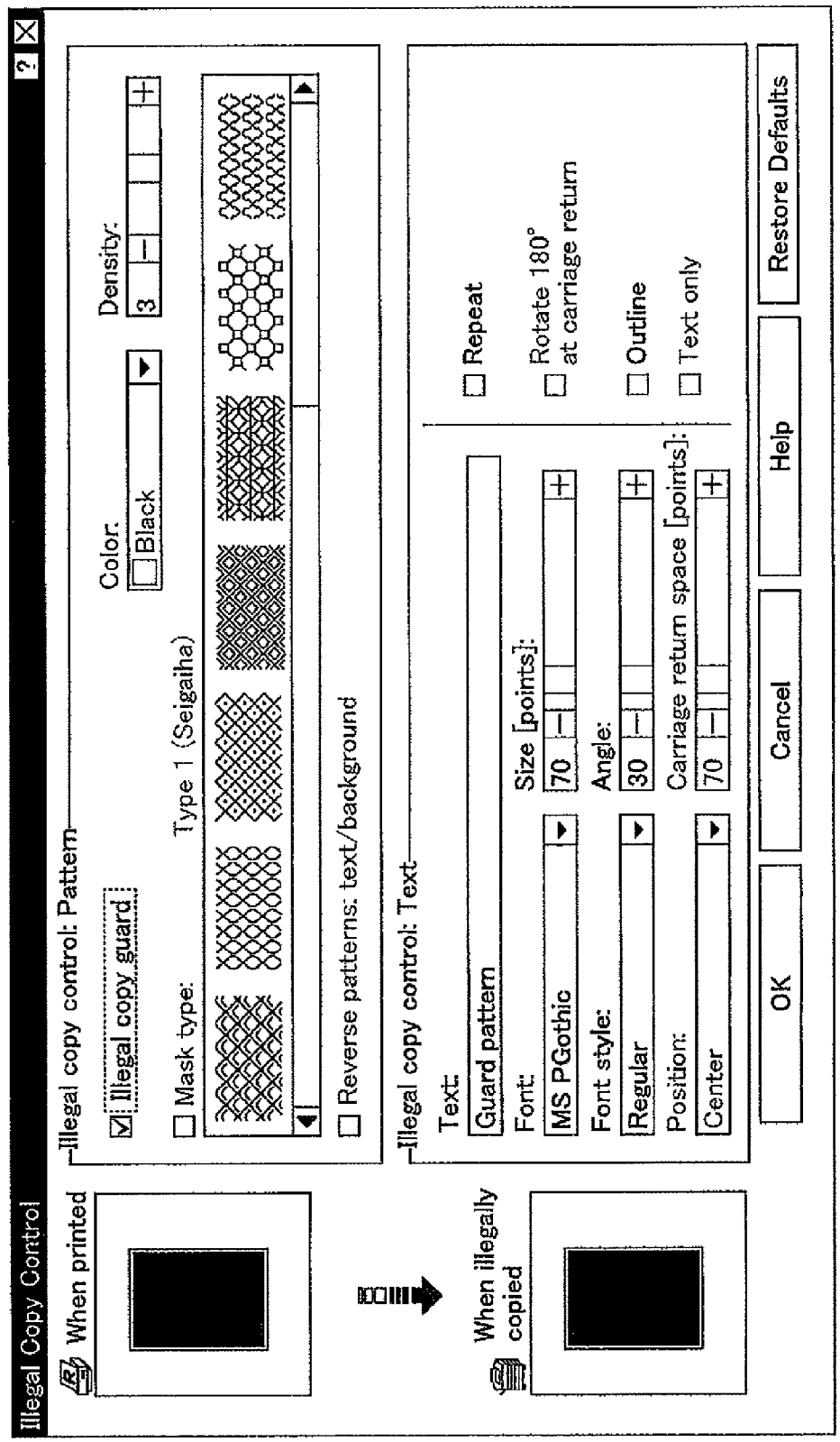
FIG. 7 is a diagram showing a ground pattern setup screen according to the embodiment of the present invention.

FIG. 7 is a diagram showing a ground pattern setup screen.

Referring to FIG. 3, in the computer terminal 10, the operating system such as Windows (registered trademark) of Microsoft Corporation is in operation, and an application program (hereinafter also simply referred to as "application") 21, a printer driver 30, and a graphical device interface (GDI) 22, a spooler 23, and a port monitor 24, which are components of the OS, are in operation at the time of printing.

The printer driver 30 includes a user interface (UI) part 31, a bidirectional communications part 32, a drawing part 33, a ground pattern generation part 34, and a ground pattern storage part 35.

Referring also to FIG. 4, first, in step S1, a user instructs the application 21 to open a print setup screen by operating the input part 17 (hereinafter also simply referred to as "user's operation").

In response to reception of the instruction, in step S2, the application 21 instructs the UI part 31 of the printer driver 30 to open a print setup screen.

In response to reception of the instruction, in step S3, the UI part 31 of the printer driver 30 requests the bidirectional communications part 32 to obtain ground pattern addition information.

In response to reception of the instruction, in step S4, the bidirectional communications part 32 requests one of the printers 1 through 3 to obtain ground pattern addition information. In this case, by way of example, it is assumed that the bidirectional communications part 32 requests the printer 1 to obtain ground pattern addition information.

In response to reception of the request, in step S5, the printer 1 (main body) obtains ground pattern addition information indicating whether settings for adding a ground pattern to printing data (drawing data) are made, and transmits the ground pattern addition information to the bidirectional communications part 32 of the printer driver 30 of the computer terminal 10. In step S6, the bidirectional communications part 32 transmits the ground pattern addition information to the UI part 31.

When the UI part 31 receives the ground pattern addition information from the printer 1 in response to the ground pattern addition information obtaining request to the printer 1, the UI part 31 displays a print setup screen on the display part 15 as shown in FIG. 5 or FIG. 6.

At this point, if the obtained ground pattern addition information indicates that "no ground pattern is added in the printer main body," the UI part 31 allows ground pattern addition settings to be accepted, and enables a button for displaying a ground pattern setup screen for accepting an input of ground pattern addition settings (hereinafter referred to as "ground pattern setup button") to be pressed as shown in FIG. 5. If the obtained ground pattern addition information indicates that "a ground pattern is added in the printer main body," the ground pattern setup button is disabled from being pressed (or dimmed) as shown in FIG. 6. The screen displayed at this point serves as a screen rejecting ground pattern addition settings.

If the ground pattern setup button may be pressed, the UI part 31 instructs a ground pattern setup part 31a thereof to open a ground pattern setup screen in response to the ground pattern setup button being pressed by the user's operation. As a result, the ground pattern setup part 31a displays a ground pattern setup screen for setting a ground pattern on the display part 15 as shown in FIG. 7.

When settings for a ground pattern (including settings for adding a ground pattern) are input by the user's operation in step S7, and the UI part 31 is instructed to close the ground pattern setup screen through the ground pattern setup screen by the user's operation (for example, pressing an OK button on the ground pattern setup screen) and to close the print setup screen through the print setup screen by the user's operation (for example, pressing an OK button on the print setup screen) in order to determine the settings for a ground pattern (including the settings for adding a ground pattern) in step S8, the UI part 31 executes the following processing in step S9.

That is, the UI part 31 stores the information set on the ground pattern setup screen in a DEVMODE structure (a structure where screen-mode-related information is recorded), and returns the DEVMODE structure to the application 21.

This DEVMODE structure has a field representing whether to add a ground pattern (hereinafter referred to as "ground pattern addition field"). If the ground pattern addition information indicates that "a ground pattern is added in the printer main body," the information of "adding no ground pattern" is stored in the ground pattern addition field. If the ground pattern addition information indicates that "no ground pattern is added in the printer main body," the information set on the ground pattern setup screen is stored in the ground pattern addition field.

If the UI part 31 fails to obtain ground pattern addition information from the printer 1 in response to the ground pattern addition information obtaining request to the printer 1, the UI part 31 may allow ground pattern addition settings to be accepted and enable the ground pattern setup button to be pressed.

Figure 8:
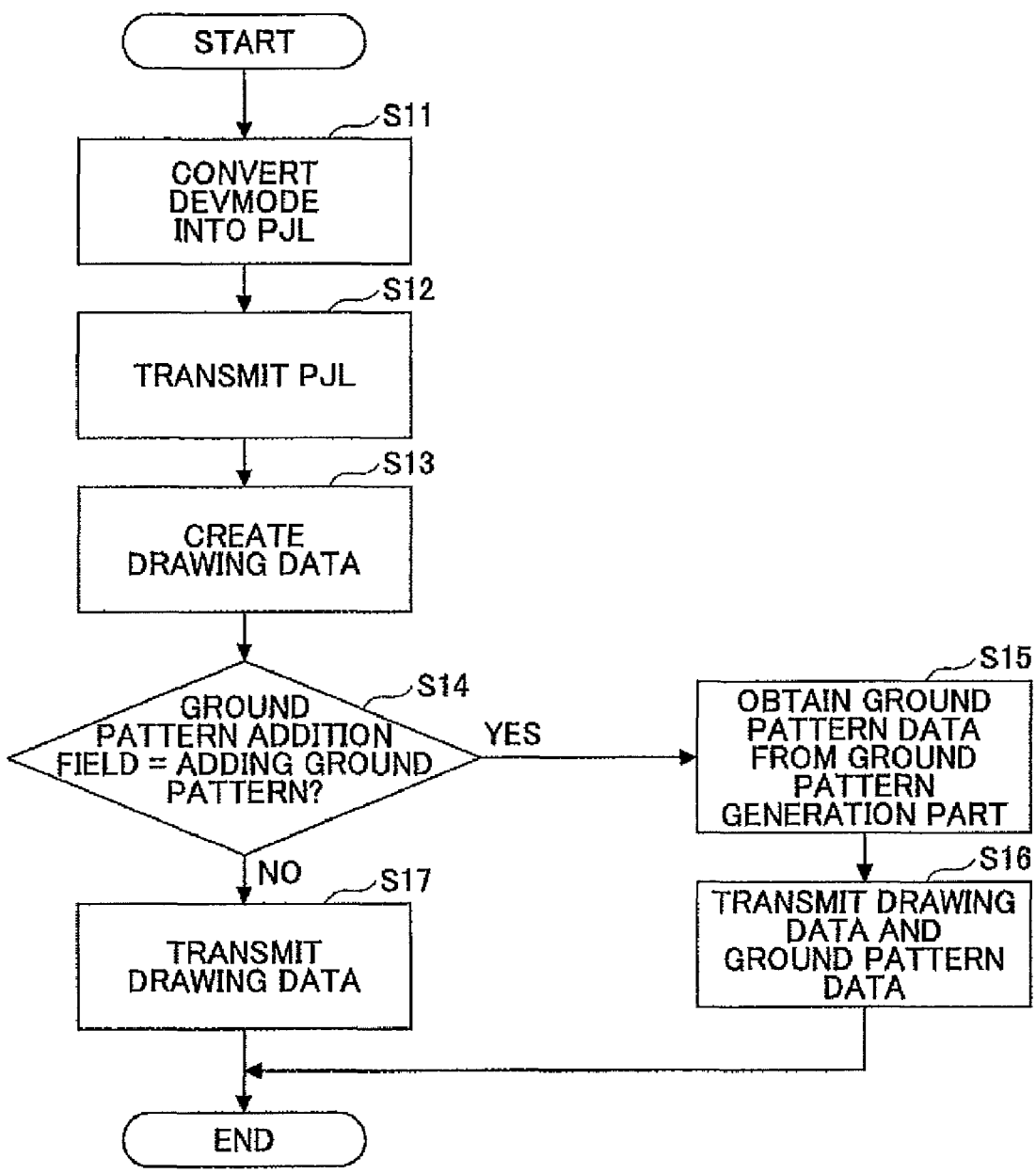
FIG. 8 is a flowchart showing processing by a drawing part of FIG. 3 according to the embodiment of the present invention.

FIG. 8 is a flowchart showing processing by the drawing part 33 of the printer driver 30 of FIG. 3.

In response to reception of a PRINT instruction (an instruction for printing) given by the user's operation, the application 21 passes a DEVMODE structure to the drawing part 33 of the printer driver 30 through the GDI 22, and notifies the printer driver 30 of the contents of a document (printing data) by a GDI call. The GDI 122 converts the GDI call into a DDI call.

Then, in step S11 of FIG. 8, the drawing part 33 of the printer driver 30 converts the DEVMODE structure into printer job language (PJL) (job description language), and in step S12, the drawing part 33 transmits the DEVMODE in PJL to the spooler 23.

Thereafter, in step S13, the drawing part 33 creates drawing data in accordance with the contents of the DDI call and the DEVMODE structure. At this point, in step S14, it is determined whether the ground pattern addition field of the DEVMODE structure indicates that "a ground pattern is to be added." If the ground pattern addition field of the DEVMODE structure indicates that "a ground pattern is to be added," (YES in step S14), the drawing part 33 requests the ground pattern generation part 34 to create a ground pattern.

In step S15, in response to reception of the request, the ground pattern generation part 34 reads a ground pattern from the ground pattern storage part 35. Then, the ground pattern generation part 34 creates ground pattern data using the pattern, and returns (transmits) the ground pattern data to the drawing part 33.

The ground pattern storage part 35 stores ground patterns for generating ground pattern data.

Figure 9:
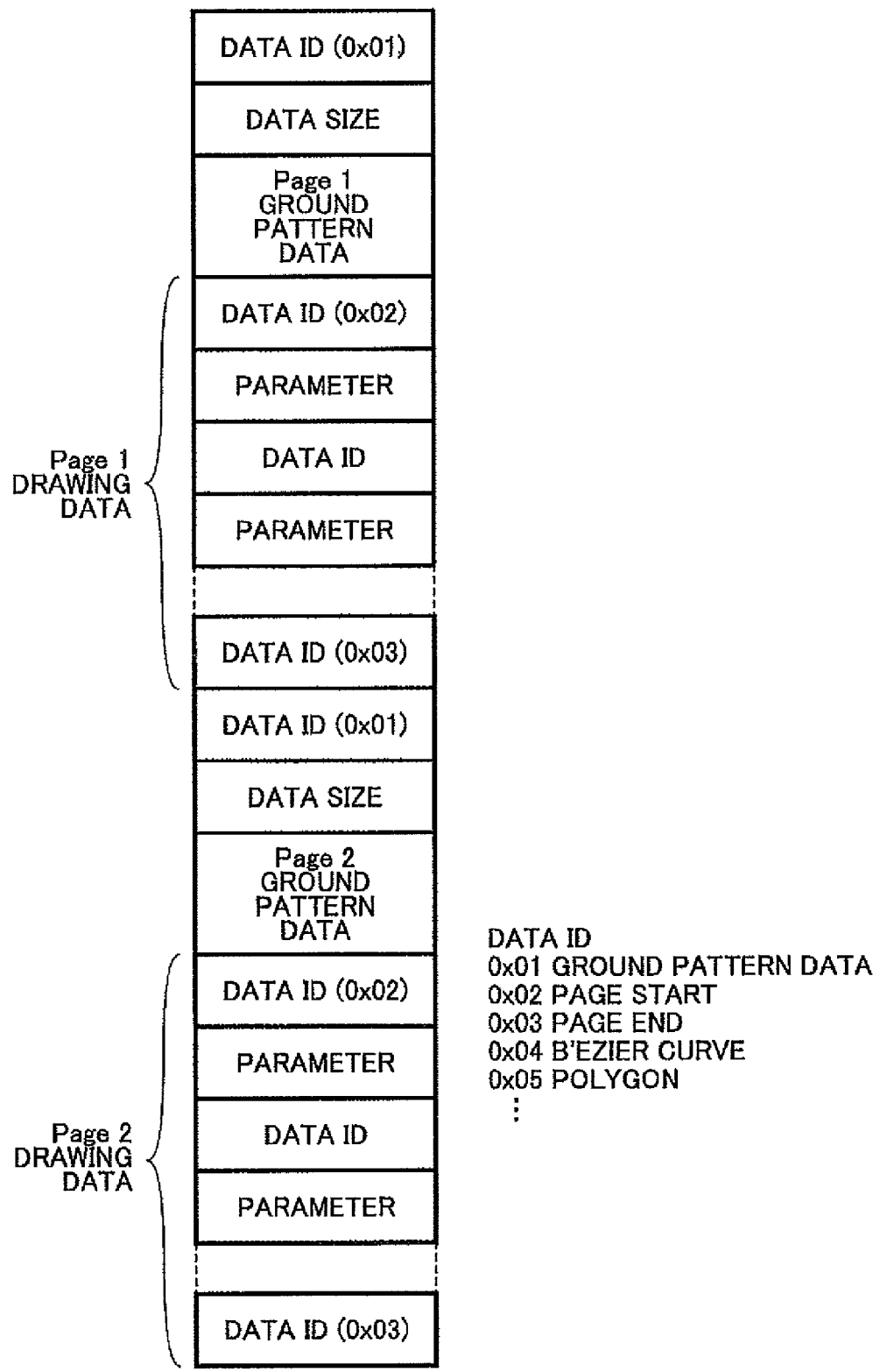
FIG. 9 is a diagram for illustrating a data stream in a format where received ground pattern data are distinguishable from drawing data according to the embodiment of the present invention.

In step S16, the drawing part 33 transmits the drawing data and the received ground pattern data to the spooler 23 as a data stream in such a format as to enable the received ground pattern data to be distinguished from the drawing data (FIG. 9).

FIG. 9 is a diagram for illustrating a data stream in a format where the received ground pattern data are distinguishable from the drawing data. In the illustrated case, it can be determined whether the contents of data are ground pattern data or other data based on an ID (identification information) uniquely assigned to each data type. Size information is omitted for data whose size can be determined with their ID only.

If the ground pattern addition field of the DEVMODE structure indicates that "no ground pattern is to be added," (NO in step S14), in step S17, the drawing part 33 transmits only the drawing data to the spooler 23.

The processing shown in FIG. 8 is repeated for each page.

The spooler 23 transmits the data sent from the printer driver 30 to one of the printers 1 through 3 through the port monitor 24.

According to the above-described configuration, it is possible to prevent a ground pattern from being added by a printer driver in the case of adding a ground pattern in a printer main body.

Figure 10:
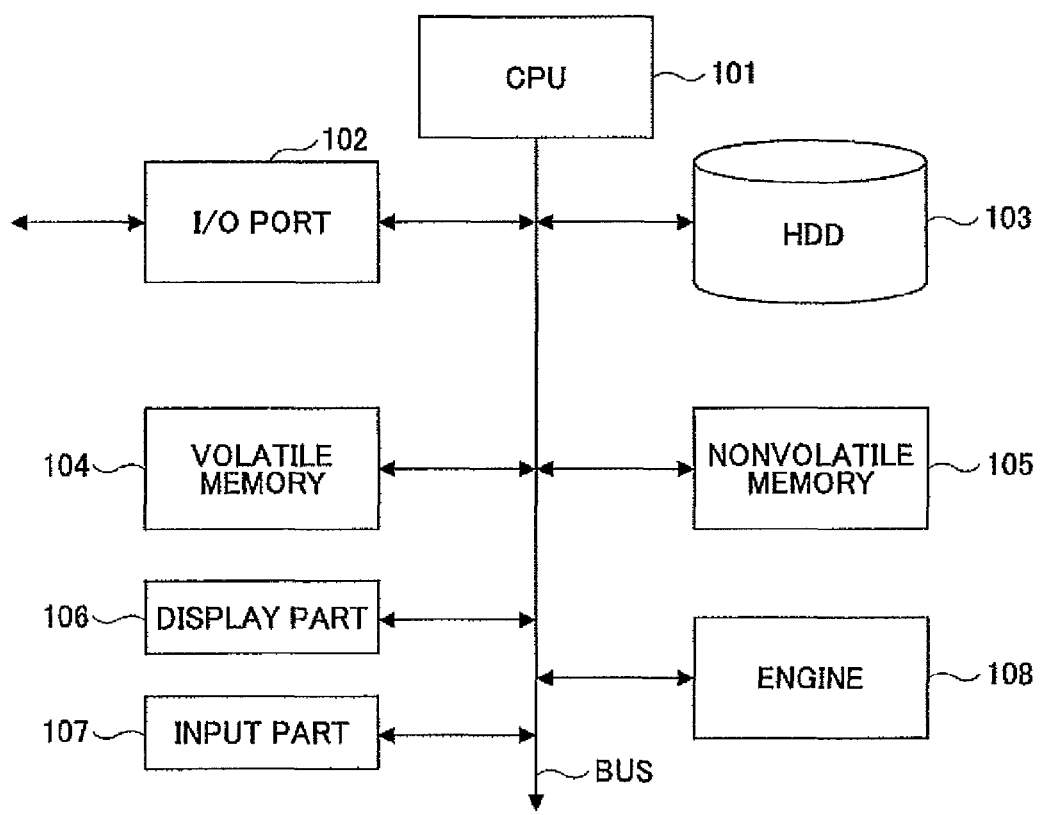
FIG. 10 is a block diagram showing a hardware configuration of a printer of FIG. 1 according to the embodiment of the present invention.

Next, a description is given, with reference to FIG. 10, of a hardware configuration of the printer 1 of FIG. 1. A graphical illustration and description of the hardware configurations of the printers 2 and 3 are omitted because the printers 2 and 3 have the same hardware configuration as the printer 1.

FIG. 10 is a block diagram showing a hardware configuration of the printer 1 of FIG. 1.

Referring to FIG. 10, the printer 1 includes a CPU 101, an I/O port 102, an HDD 103, a volatile memory 104, a nonvolatile memory 105, a display part 106, an input part 107, and an engine 108, which are connected through a bus.

The CPU 101 manages and controls the printer 1.

The I/O port 102 is a communications part for receiving the printing data of a print job transmitted from the computer terminal 10 or 20, which is an external apparatus.

The HDD 103 is a large-capacity storage part for storing various data.

The volatile memory 104 is a readable and writable storage part such as a RAM, which the CPU 101 uses as a work area for performing processing or as an image area for creating bitmap data based on the printing data of a print job.

The nonvolatile memory 105 is a storage part such as a flash ROM, where control programs and various data are stored.

The display part 106 is, for example, a CRT display or an LCD display for displaying the status of the printer 1 and an operations screen for making settings for adding a ground pattern.

The input part 107 receives inputs of information on various operations.

The engine 108 prints (forms an image of) bitmap data created by the CPU 101 on a printing medium such as paper as a visible image.

According to the printer 1 thus configured, the CPU 101 operates in accordance with the control programs in the nonvolatile memory 105 (that is, the CPU 101 selectively executes the various control programs as required), and controls the apparatus including the display part 106. Thereby, the CPU 101 is capable of implementing various functions including functions as a communication connection part, a ground pattern addition setting part, a ground pattern adding part, a processing part, and a ground pattern changing part.

In this printer 1 also, it is possible to set (determine) a ground pattern through a user's operation by the CPU 101 displaying the ground pattern setup screen as shown in FIG. 7 on the display part 106. At this point, corresponding ground pattern addition information is written in a settings storage area 202 (FIG. 11) in the nonvolatile memory 105 (or the HDD 103).

Next, a specific description is given, with reference to FIG. 11 through FIG. 14, of a software configuration and printing-related processing of the printer 1. A graphical illustration and description of the software configurations and printing-related processing of the printers 2 and 3 are omitted because the printers 2 and 3 have the same software configuration and perform the same printing-related processing as the printer 1.

Figure 11:
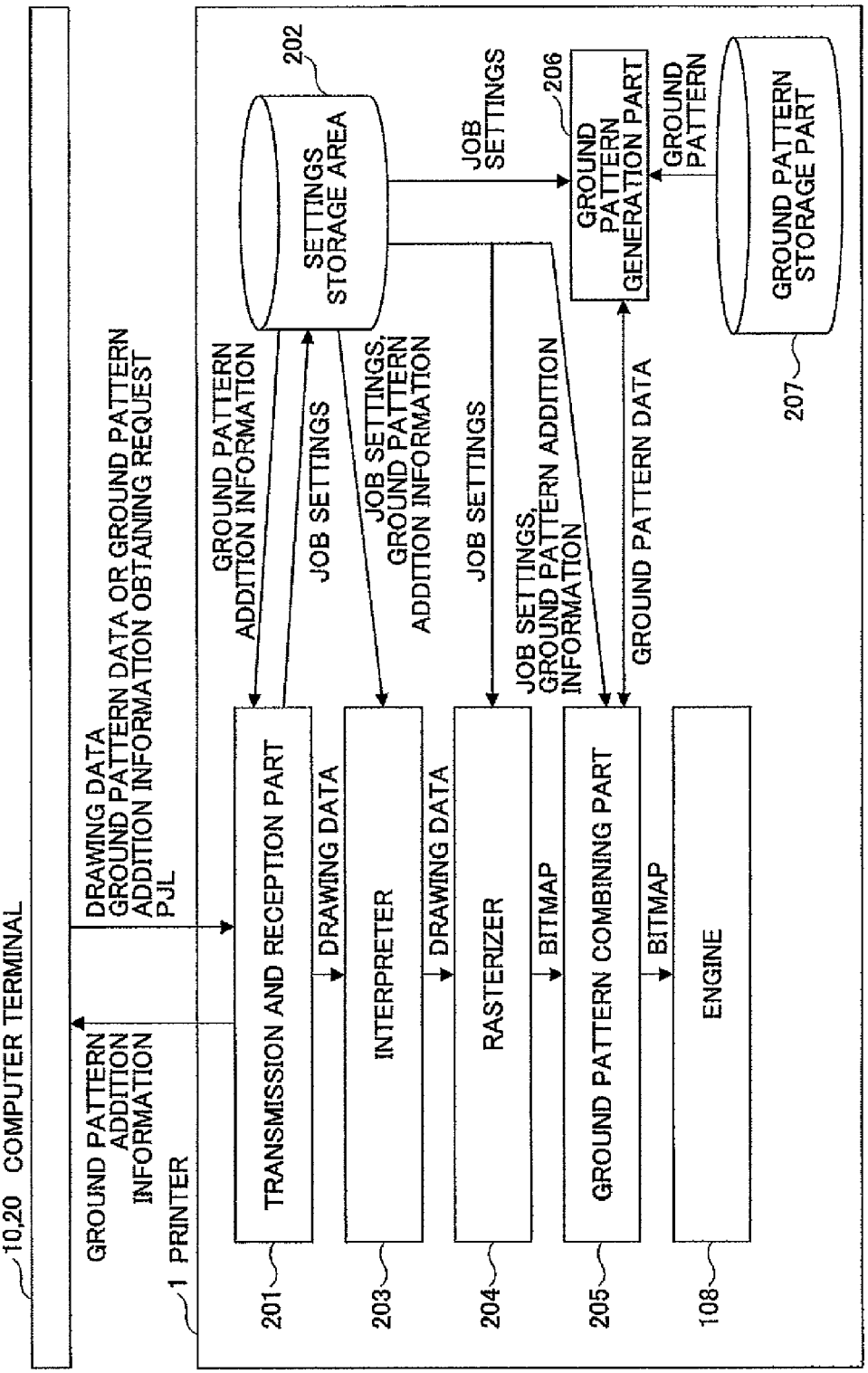
FIG. 11 is a block diagram showing a software configuration of the printer of FIG. 1 according to the embodiment of the present invention.

FIG. 11 is a block diagram showing a software configuration of the printer 1 of FIG. 1.

Figure 12:
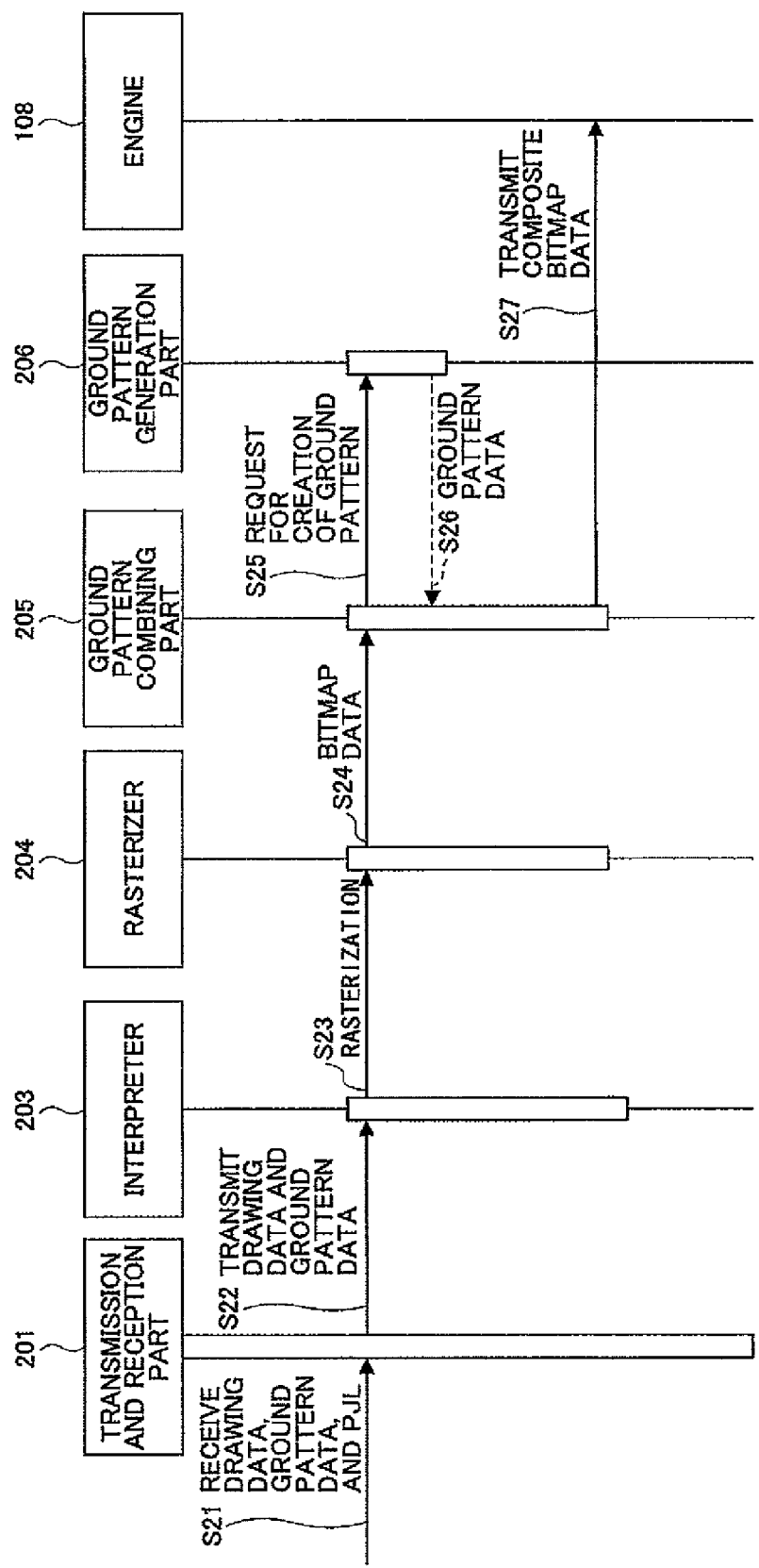
FIG. 12 is a diagram showing part of a processing sequence by control software of the printer shown in FIG. 11 according to the embodiment of the present invention.

FIG. 12 is a diagram showing part of a processing sequence by the control software of the printer 1 shown in FIG. 11. The processing sequence corresponds to the case where a ground pattern is added on the printer 1 side and a job is not canceled.

Referring to FIG. 11, the printer 1 includes a transmission and reception part 201, the settings storage area 202, an interpreter 203, a rasterizer 204, a ground pattern combining part 205, a ground pattern generation part 206, and a ground pattern storage part 207.

Referring to FIG. 11 and FIG. 12, in response to reception of a ground pattern addition information request from the computer terminal 10 or 20, the transmission and reception part 201 reads and obtains ground pattern addition information from the settings storage area 202, and transmits the obtained ground pattern addition information to the transmitter of the ground pattern addition information request.

Further, in step S21 of FIG. 12, the transmission and reception part 201 receives drawing data, ground pattern data, and information described in PJL from the computer terminal 10 or 20, and stores the PJL information in the settings storage area 202 as job settings information. Then, in step S22, the transmission and reception part 201 transmits the drawing data and the ground pattern data to the interpreter 203.

In step S23, the interpreter 203 interprets the transmitted data, and controls the rasterizer 204 to convert the drawing data with or without the ground pattern data into bitmap data (image data). At this point, the interpreter 203 reads the ground pattern addition information from the settings storage area 202. If the ground pattern addition information is "adding a ground pattern," the interpreter 203 ignores the ground pattern data, and interprets only the drawing data and controls the rasterizer 204 to convert the drawing data into bitmap data. If the ground pattern addition information is "adding no ground pattern," the interpreter 203 interprets both drawing data and ground pattern data, and controls the rasterizer 204 to convert the drawing data and the ground pattern data into bitmap data.

Figure 13:
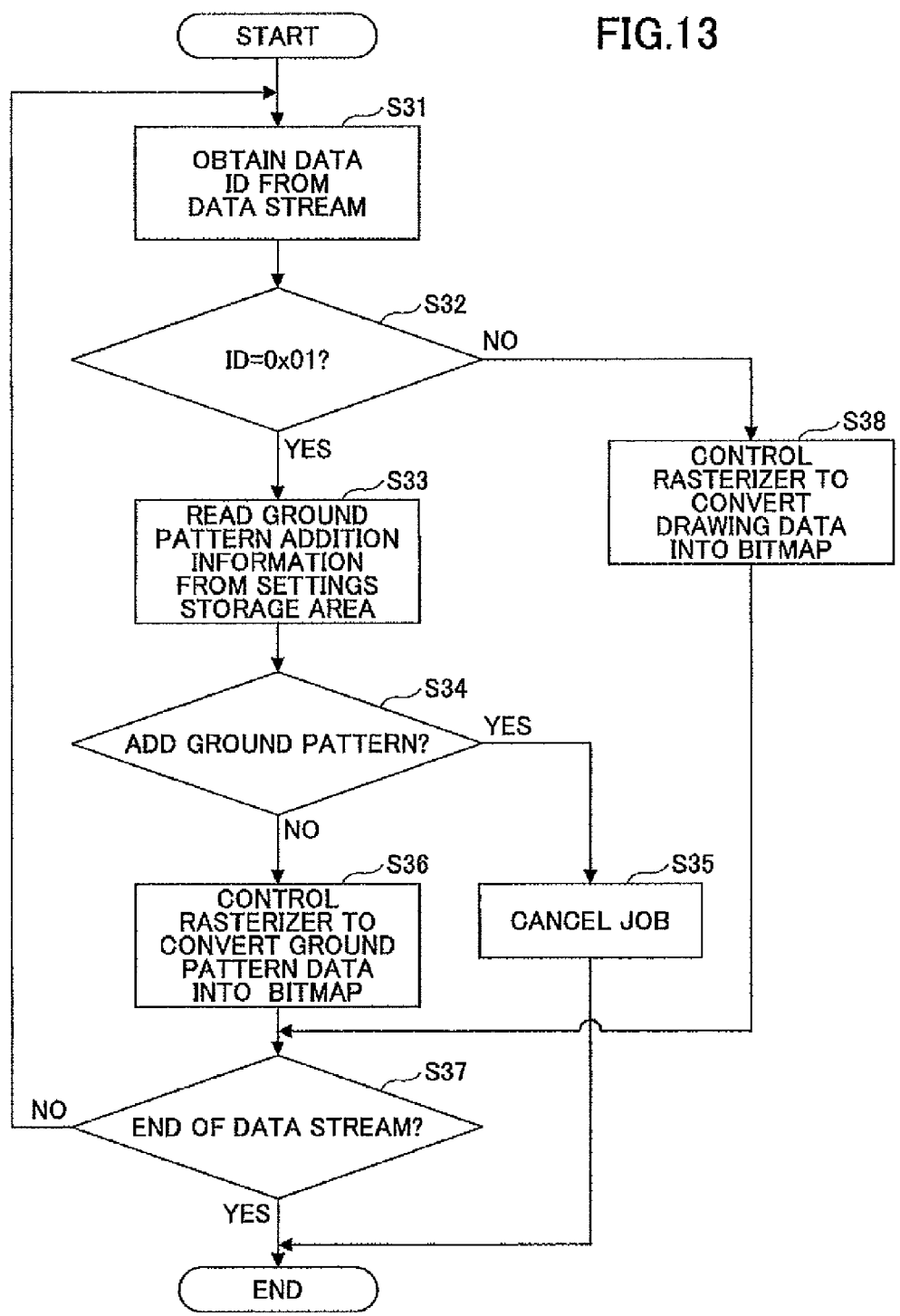
FIG. 13 is a flowchart showing processing by an interpreter of FIG. 11 according to the embodiment of the present invention.

As a variation, if the printing data of a print job including ground pattern data have been transmitted from the computer terminal 10 or 20 in the case of "adding a ground pattern," the print job may be canceled. FIG. 13 is a flowchart showing processing by the interpreter 203 in this case.

Referring to FIG. 13, in step S31, the interpreter 203 obtains a data ID from a data stream. In step S32, the interpreter determines whether the data ID is 0x01 (FIG. 9). If the data ID is 0x01 (YES in step S32), in step S33, the interpreter 203 reads the ground pattern addition information from the settings storage area 202. In step S34, the interpreter 203 determines whether the ground pattern addition information is "adding a ground pattern." If the ground pattern addition information is "adding a ground pattern" (YES in step S34), in step S35, the interpreter 203 cancels the job, and the processing ends.

If the ground pattern addition information is "adding no ground pattern" (NO in step S34), in step S36, the interpreter 203 controls the rasterizer 204 to convert the ground pattern data into bitmap data. Then, in step S37, the interpreter 203 determines whether the data stream has ended. If the data stream has ended (YES in step S37), the processing ends. If the data stream has not ended (NO in step S37), the processing returns to step S31.

If the data ID is not 0x01 (NO in step S32), in step S38, the interpreter 203 controls the rasterizer 204 to convert the drawing data into bitmap data, and the processing proceeds to step S36.

Figure 14:
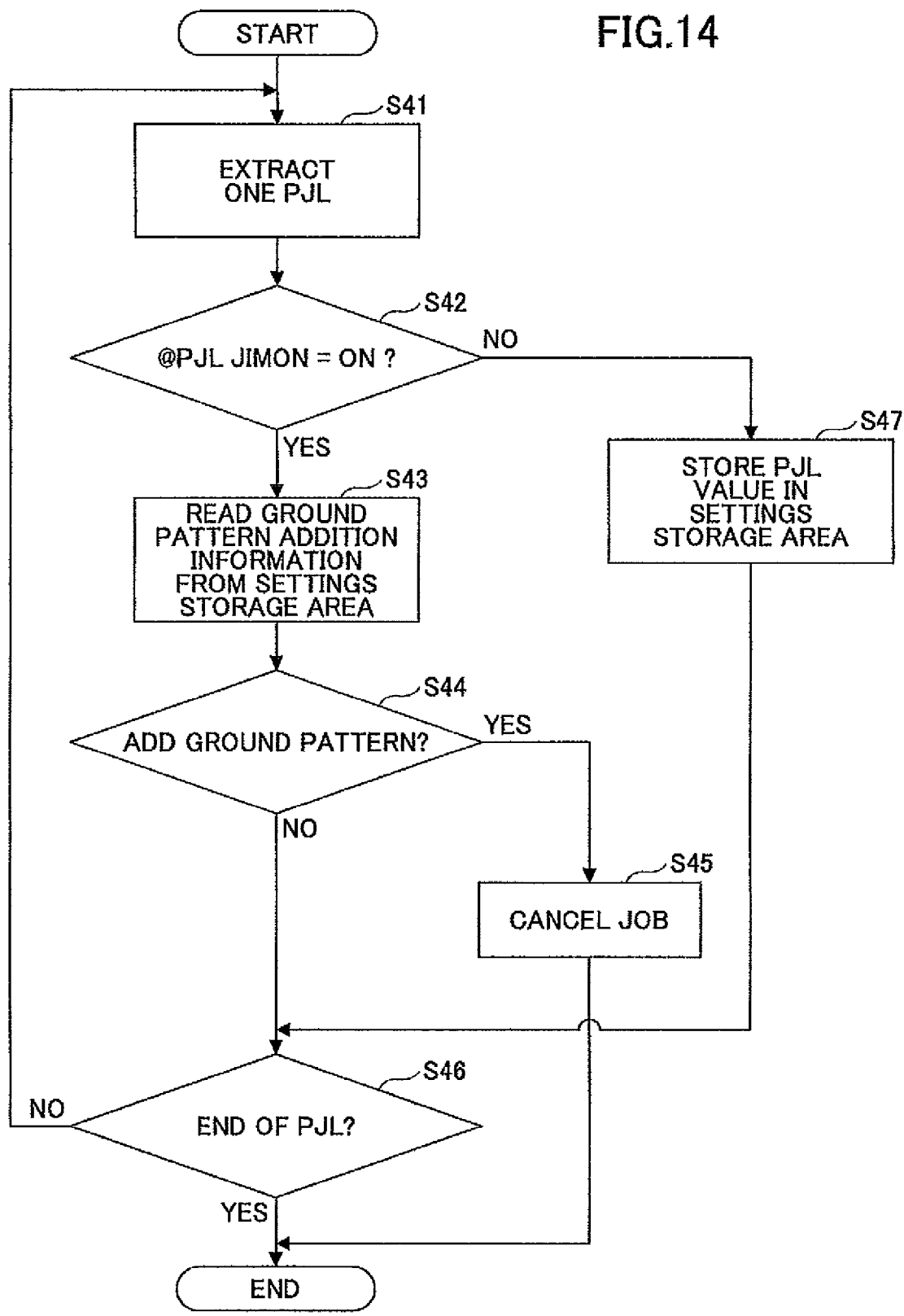
FIG. 14 is a flowchart showing processing by a transmission and reception part of FIG. 11 according to the embodiment of the present invention.

Further, as another variation, the transmission and reception part 201 may cancel a job if there is PJL information "@PJL GROUND PATTERN=ON" generated by the drawing part 33 that indicates addition of a ground pattern in the printer driver 30 of FIG. 3, and the ground pattern addition information contained in the settings storage area 202 is "adding a ground pattern." FIG. 14 is a flowchart showing processing by the transmission and reception part 201 in this case. This processing may be performed because the data stream transmitted from the computer terminal 10 or 20 is formatted so that the ground pattern data and the drawing data are distinguishable as shown in FIG. 9.

Referring to FIG. 14, in step S41, the transmission and reception part 201 extracts one PJL information item from a data stream. In step S42, the transmission and reception part 201 determines whether the extracted PJL information item is "@PJL GROUND PATTERN=ON." If the extracted PJL information item is "@PJL GROUND PATTERN=ON" (YES in step S42), in step S43, the transmission and reception part 201 reads ground pattern addition information from the settings storage area 202. Then, in stop S44, the transmission and reception part 201 determines whether the ground pattern addition information is "adding a ground pattern." If the ground pattern addition information is "adding a ground pattern" (YES in step S44), in step S45, the transmission and reception part 201 cancels the job, and the processing ends. If the ground pattern addition information is "adding no ground pattern" (NO in step S44), in step S46, the transmission and reception part 201 determines whether the extracted PJL information item is the end of the PJL information. If the extracted PJL information item is the end of the PJL information, the processing ends. If the extracted PJL information item is not the end of the PJL information, the processing returns to step S41.

If the extracted PJL information item is not "@PJL GROUND PATTERN=ON" (NO in step S42), in step S47, the transmission and reception part 201 stores the value of the PJL information item in the settings storage area 202, and the processing proceeds to step S46.

Referring back to FIG. 12, in step S24, the rasterizer 204 transmits the created bitmap data to the ground pattern combining part 205.

In response to reception of the bitmap data, in step S25, the ground pattern combining part 205 reads the ground pattern addition information from the settings storage area 202, and if the ground pattern addition information is "adding a ground pattern," the ground pattern combining part 205 requests the ground pattern generation part 206 to create ground pattern data. That is, the ground pattern combining part 205 is enabled to combine (add) ground pattern data.

In response to reception of the ground pattern creation request, in step S26, the ground pattern generation part 206 reads a ground pattern from the ground pattern storage part 207. Then, the ground pattern generation part 206 creates ground pattern data from the read ground pattern based on the job settings information stored in the settings storage area 202, and passes the created ground pattern data to the ground pattern combining part 205.

The ground pattern storage part 207 contains ground patterns for generating ground pattern data.

In response to reception of the ground pattern data from the ground pattern generation part 206, in step S27, the ground pattern combining part 205 combines the ground pattern data with the bitmap data previously received from the rasterizer 204, and transmits the composite bitmap data (after the combining) to the engine 108. If the ground pattern addition information read from the settings storage area 202 in step S25 is "adding no ground pattern," the ground pattern combining part 205 transmits the bitmap data received from the rasterizer 204 directly to the engine 108.

The engine 108 prints the received bitmap data on a printing medium as a visible image.

Thus, according to this embodiment, the computer terminal (10, 20) produces, for example, the following effects.

(a) Through bidirectional communications with a printer, the computer terminal obtains ground pattern addition information indicating whether settings for adding a ground pattern are made in the printer (that is, whether it is determined that a ground pattern is to be added in the printer). If the ground pattern addition information indicates that settings for adding a ground pattern are made, the computer terminal prevents ground pattern settings from being accepted. If the ground pattern addition information indicates that settings for adding a ground pattern are not made, the computer terminal authorizes acceptance of ground pattern settings. Thereby, if settings for adding a ground pattern are made on the printer side, printing data with no ground pattern are transmitted to the printer, and if no settings for adding a ground pattern are made on the printer side, printing data with a ground pattern are transmitted to the printer As a result, it is possible to prevent a ground pattern from being redundantly or doubly added to printing data.

(b) The computer terminal displays a screen that rejects settings for adding a ground pattern if the acceptance of the settings for adding a ground pattern is prohibited, and displays a screen that accepts settings for adding a ground pattern if the acceptance of the settings for adding a ground pattern is authorized. As a result, a user can be informed whether it is possible to make settings for adding a ground pattern on the computer terminal side. This prevents an operation for making settings for adding a ground pattern from being performed in vain.

(c) If the ground pattern addition information indicating whether settings for adding a ground pattern are made cannot be obtained, it is possible to avoid the inconvenience that no ground pattern is added to printing data although its addition is desired by authorizing acceptance of settings for adding a ground pattern.

Further, according to this embodiment, the printer (1, 2, 3) produces, for example, the following effect.

That is, in the case of receiving printing data with a ground pattern added thereto from a computer terminal when settings for adding a ground pattern are made in the printer, it is possible to avoid the inconvenience that the ground pattern not set in the printer but set in the computer terminal is added to the printing data received from the computer terminal by ignoring the received ground pattern and validating addition of the ground pattern in the printer, thereby changing the ground pattern to be added to the printing data.

In the case of receiving printing data with a ground pattern added thereto from a computer terminal when settings for adding a ground pattern are made in the printer, the same effect as described above can also be produced by ignoring the printing data.

[Program in this Embodiment]

A program according to this embodiment causes a computer (CPU) controlling a computer terminal to implement functions as a communication connection part, a printing setting part, a ground pattern adding part, a ground pattern addition information obtaining part, a ground pattern addition setting acceptance control part, and a screen display part, and/or causes a computer (CPU) controlling a printer to implement functions as a communication connection part, a ground pattern addition setting part, a ground pattern adding part, a processing part, and a ground pattern changing part. One or more of the above-described effects are produced by causing the computer to execute this program.

The program may be stored in a storage part of the computer terminal or printer, such a ROM or HDD. Alternatively, the program may be provided by being recorded on a recording medium such as a CD-ROM, flexible disk, MO, CD-R, CD-RW, DVD+R, DVD+RW, DVD-R, DVD-RW, or DVD-RAM, or a nonvolatile recording medium (memory) such as an EEPROM or memory card. One or more of the above-described procedures may be executed by installing the program recorded on the recording medium or nonvolatile recording medium in the computer terminal and/or printer and causing the CPU to execute the program or by causing the CPU to read the program from the recording medium or nonvolatile recording medium.

Further, the program may also be downloaded from an external apparatus connected to the computer terminal or the printer through a network such as a LAN or the Internet and be executed, where the external apparatus has the program recorded on a recording medium or contains the program in a storage part thereof.

According to one embodiment of the present invention, a computer-readable recording medium is provided that has a program recorded therein for causing a computer to execute a method, the computer controlling a printing setting apparatus including a communication connection part configured to establish a connection to a printing apparatus so as to enable a communication therewith; a printing setting part configured to make a setting with respect to printing of printing data to be transmitted to the printing apparatus; and a ground pattern adding part configured to add a first ground pattern to the printing data in response to the printing setting part making a first setting for adding the first ground pattern, the method including the steps of (a) obtaining ground pattern addition information indicating whether a second setting for adding a second ground pattern is made in the printing apparatus by bidirectionally performing the communication with the printing apparatus; and (b) disabling the printing setting part from accepting the first setting for adding the first ground pattern in response to step (a) obtaining the ground pattern addition information indicating that the second setting for adding the second ground pattern is made in the printing apparatus, and enabling the printing setting part to accept the first setting for adding the first ground pattern in response to step (a) obtaining the ground pattern addition information indicating that the second setting for adding the second ground pattern is not made in the printing apparatus.

According to one embodiment of the present invention, a computer-readable recording medium is provided that has a program recorded therein for causing a computer to execute a method, the computer controlling a printing apparatus including a communication connection part configured to establish a connection to a printing setting apparatus so as to enable a communication therewith; a ground pattern addition setting part configured to make a setting for adding a first ground pattern; and a ground pattern adding part configured to add the first ground pattern to printing data received from the printing setting apparatus in response to the ground pattern addition setting part making the setting for adding the first ground pattern, the method including the step of replacing a second ground pattern with the first ground pattern by ignoring the second ground pattern and enabling the ground pattern adding part to add the first ground pattern to the printing data in response to receiving the printing data having the second ground pattern added thereto from the printing setting apparatus when the setting for adding the first ground pattern is made by the ground pattern addition setting part, wherein the printing apparatus further includes a processing part configured to process the printing data having one of the first ground pattern and the second ground pattern added thereto.

According to one aspect of the present invention, a printing setting apparatus obtains ground pattern addition information indicating whether settings for adding a ground pattern are made in a printing apparatus through bidirectional communications with the printing apparatus. If the ground pattern addition information indicates that settings for adding a ground pattern are made in the printing apparatus, acceptance of settings for adding a ground pattern is prohibited in the printing setting apparatus. If the ground pattern addition information indicates that settings for adding a ground pattern are not made in the printing apparatus, acceptance of settings for adding a ground pattern is authorized in the printing setting apparatus. As a result, printing data having no ground pattern added thereto are transmitted to the printing apparatus if settings for adding a ground pattern are made on the printing apparatus side, and printing data having a ground pattern added thereto are transmitted to the printing apparatus if settings for adding a ground pattern are not made on the printing apparatus side. Thus, it is possible to prevent a ground pattern from being added redundantly or doubly to printing data.

Thus, according to one aspect of the present invention, it is possible to prevent a ground pattern from being added redundantly or doubly to printing data (data to be printed). Accordingly, it is possible to provide a printing setting apparatus and a printing apparatus capable of printing data with a single ground pattern.

The present invention is not limited to the specifically disclosed embodiment, and variations and modifications may be made without departing from the scope of the present invention.

The present application is based on Japanese Priority Patent Applications No. 2007-219966, filed on Aug. 27, 2007 and No. 2008-151836, filed on Jun. 10, 2008, the entire contents of which are hereby incorporated herein by reference.

What is claimed is:

1. A printing setting apparatus, comprising:
a communication connection part configured to establish a connection to a printing apparatus so as to enable a communication therewith;
a printing setting part configured to make a setting with respect to printing of printing data to be transmitted to the printing apparatus;
a ground pattern adding part configured to add a first ground pattern to the printing data in response to the printing setting part making a first setting for adding the first ground pattern;
a ground pattern addition information obtaining part configured to obtain ground pattern addition information indicating whether a second setting for adding a second ground pattern is made in the printing apparatus by bidirectionally performing the communication with the printing apparatus; and
a ground pattern addition setting information acceptance control part configured to disable the printing setting part from accepting the first setting for adding the first ground pattern in response to the ground pattern addition information obtaining part obtaining the ground pattern addition information indicating that the second setting for adding the second ground pattern is made in the printing apparatus, and to enable the printing setting part to accept the first setting for adding the first ground pattern in response to the ground pattern addition information obtaining part obtaining the ground pattern addition information indicating that the second setting for adding the second ground pattern is not made in the printing apparatus.

2. The printing setting apparatus as claimed in claim 1, further comprising:
a screen display part configured to display a screen rejecting the first setting for adding the first ground pattern in response to the ground pattern addition setting information acceptance control part disabling the printing setting part from accepting the first setting for adding the first ground pattern, and to display a screen accepting the first setting for adding the first ground pattern in response to the ground pattern addition setting information acceptance control part enabling the printing setting part to accept the first setting for adding the first ground pattern.

3. The printing setting apparatus as claimed in claim 1, wherein the ground pattern addition setting information acceptance control part enables the printing setting part to accept the first setting for adding the first ground pattern in response to the ground pattern addition information obtaining part failing to obtain the ground pattern addition information.

4. A non-transitory computer-readable recording medium having a program recorded therein for causing a computer to execute a method, the computer controlling a printing setting apparatus including a communication connection part configured to establish a connection to a printing apparatus so as to enable a communication therewith; a printing setting part configured to make a setting with respect to printing of printing data to be transmitted to the printing apparatus; and a ground pattern adding part configured to add a first ground pattern to the printing data in response to the printing setting part making a first setting for adding the first ground pattern, the method comprising the steps of:
(a) obtaining ground pattern addition information indicating whether a second setting for adding a second ground pattern is made in the printing apparatus by bidirectionally performing the communication with the printing apparatus; and
(b) disabling the printing setting part from accepting the first setting for adding the first ground pattern in response to said step (a) obtaining the ground pattern addition information indicating that the second setting for adding the second ground pattern is made in the printing apparatus, and enabling the printing setting part to accept the first setting for adding the first ground pattern in response to said step (a) obtaining the ground pattern addition information indicating that the second setting for adding the second ground pattern, is not made in the printing apparatus.

5. The non-transitory computer-readable recording medium as claimed in claim 4, wherein the method further comprises the step of:
(c) displaying a screen rejecting the first setting for adding the first ground pattern in response to said step (b) disabling the printing setting part from accepting the first setting for adding the first ground pattern, and displaying a screen accepting the first setting for adding the first ground pattern in response to said step (b) enabling the printing setting part to accept the first setting for adding the first ground pattern.

6. The non-transitory computer-readable recording medium as claimed in claim 4, wherein said step (b) enables the printing setting part to accept the first setting for adding the first ground pattern in response to said step (a) failing to obtain the ground pattern addition information.

* * * * *